(12) United States Patent
Hu et al.

(10) Patent No.: US 12,401,260 B2
(45) Date of Patent: Aug. 26, 2025

(54) MAGNETISM MODULATING RING STRUCTURE, MAGNETIC GEAR ASSEMBLY

(71) Applicant: GREE ELECTRIC APPLIANCES, INC. OF ZHUHAI, Guangdong (CN)

(72) Inventors: Yusheng Hu, Zhuhai (CN); Bin Chen, Zhuhai (CN); Xiaohao Ma, Zhuhai (CN); Quanfeng Li, Zhuhai (CN); Pengqian Gui, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 178 days.

(21) Appl. No.: 18/020,941

(22) PCT Filed: Jul. 30, 2021

(86) PCT No.: PCT/CN2021/109495
§ 371 (c)(1),
(2) Date: Feb. 12, 2023

(87) PCT Pub. No.: WO2022/110866
PCT Pub. Date: Jun. 2, 2022

(65) Prior Publication Data
US 2023/0283160 A1    Sep. 7, 2023

(30) Foreign Application Priority Data

Nov. 30, 2020 (CN) .......................... 202011376814.7

(51) Int. Cl.
*H02K 49/10* (2006.01)
(52) U.S. Cl.
CPC .................. *H02K 49/102* (2013.01)
(58) Field of Classification Search
CPC .... H02K 49/102; H02K 49/104; H02K 49/10; H02K 7/116; F16H 49/005

(Continued)

(56) References Cited

U.S. PATENT DOCUMENTS

| 4,532,447 A | 7/1985 | Cibie | |
|---|---|---|---|
| 2010/0283345 A1* | 11/2010 | Atallah | H02K 7/11 310/114 |

(Continued)

FOREIGN PATENT DOCUMENTS

| CN | 2306365 | 2/1999 |
|---|---|---|
| CN | 1920338 A | 2/2007 |

(Continued)

OTHER PUBLICATIONS

Machine translation of CN-107196484-A. (Year: 2017).*

(Continued)

*Primary Examiner* — Michael Andrews
(74) *Attorney, Agent, or Firm* — James R. Gourley; Carstens, Allen & Gourley, LLP (57) ABSTRACT

Provided are a magnetism modulating ring structure, a magnetic gear assembly, and a compound motor. The magnetism modulating ring structure includes a plurality of modulating units and a plurality of connection parts. Each two adjacent modulating units are connected by one of the plurality of connection parts to form the magnetism modulating ring structure, and the magnetism modulating ring structure is arranged within an annular gap enclosed by a first rotor structure and a second rotor structure. A groove structure is formed on one side of the modulating unit facing the first rotor structure, and two sides of the groove structure respectively form a curved boot-like part, and an edge of the curved boot-like part facing the second rotor structure has a curved contour line parallel to flux lines passing through an inside of the curved boot-like part.

13 Claims, 6 Drawing Sheets

(58) Field of Classification Search
USPC .................................................. 310/103, 104
See application file for complete search history.

(56) References Cited

U.S. PATENT DOCUMENTS

| | | | | |
|---|---|---|---|---|
| 2011/0121672 A1* | 5/2011 | Calverley | ............ | H02K 49/102 |
| | | | | 310/216.113 |
| 2018/0269770 A1* | 9/2018 | Powell | ................. | H02K 49/102 |
| 2021/0197655 A1* | 7/2021 | Heo | .......................... | H02K 1/12 |

FOREIGN PATENT DOCUMENTS

| | | | | |
|---|---|---|---|---|
| CN | 2918894 | | 7/2007 | |
| CN | 100544170 | C | 9/2009 | |
| CN | 102032119 | A | 4/2011 | |
| CN | 201956876 | U | 8/2011 | |
| CN | 102312986 | A | 1/2012 | |
| CN | 102324821 | A | 1/2012 | |
| CN | 202203361 | U | 4/2012 | |
| CN | 202206274 | U | 4/2012 | |
| CN | 102611280 | A | 7/2012 | |
| CN | 202418482 | U | 9/2012 | |
| CN | 103635716 | A | 3/2014 | |
| CN | 103795224 | A | 5/2014 | |
| CN | 105141092 | A | 12/2015 | |
| CN | 204858940 | U | 12/2015 | |
| CN | 105429407 | A | 3/2016 | |
| CN | 106059223 | A | 10/2016 | |
| CN | 104009602 | B | 1/2017 | |
| CN | 106712452 | A | 5/2017 | |
| CN | 106787607 | A | 5/2017 | |
| CN | 206164339 | U | 5/2017 | |
| CN | 107196484 | A * | 9/2017 | ........... H02K 49/102 |
| CN | 107425697 | A | 12/2017 | |
| CN | 107516970 | A | 12/2017 | |
| CN | 108011484 | A | 5/2018 | |
| CN | 207588685 | U | 7/2018 | |
| CN | 108390539 | A | 8/2018 | |
| CN | 108964387 | A | 12/2018 | |
| CN | 109600017 | A | 4/2019 | |
| CN | 109617348 | A | 4/2019 | |
| CN | 109768681 | A | 5/2019 | |
| CN | 109768688 | A | 5/2019 | |
| CN | 108964387 | B | 10/2019 | |
| CN | 111404342 | A | 7/2020 | |
| CN | 112491247 | A | 3/2021 | |
| EP | 2763298 | A2 | 8/2014 | |
| JP | 201415991 | | 1/2014 | |
| JP | 2014015991 | A * | 1/2014 | |
| JP | 2014155253 | A | 8/2014 | |
| WO | 9836487 | A1 | 8/1998 | |

OTHER PUBLICATIONS

Machine translation of JP-2014015991-A (Year: 2014).*
English translation of Office Action for Japanese Patent Application No. 2023-509412 dated Feb. 16, 2024 (2 pages).
Extended European Search Report for European Patent Application No. 21896373.4 dated Dec. 21, 2024 (35 pages).
Office Action for Japanese Patent Application No. 2023-509412 dated Feb. 16, 2024 (2 pages).
Abdelhamid, Dalia Zaky, et al., "The Effect of Modulating Ring Design on Induction Machine with Integrated Magnetic Gear Torque," IEEE 978-1-5090-2998-3/17, 2017 (6 pages).
International Search Report of the International Searching Authority for PCT application No. PCT/CN2021/109495 dated Oct. 13, 2021 (5 pages).
Written Opinion of the International Searching Authority for PCT application No. PCT/CN2021/109495 dated Oct. 13, 2021 (7 pages).

* cited by examiner

MAGNETISM MODULATING RING STRUCTURE, MAGNETIC GEAR ASSEMBLY

CROSS-REFERENCE TO RELATED APPLICATION

This application is a U.S. National Stage of International Application No. PCT/CN2021/109495 filed on Jul. 30, 2021 entitled Magnetism Modulating Ring Structure Magnetic Gear Assembly, and Compount Motor and published as WO 2022/110866 on Jun. 2, 2022, which claims priority to Chinese Patent Application No. 202011376814.7, filed on Nov. 30, 2020, entitled "MAGNETISM MODULATING RING STRUCTURE, MAGNETIC GEAR ASSEMBLY, AND COMPOUND MOTOR", the disclosures of which are incorporated herein by reference in their entireties. Every patent application and publication listed in this paragraph is hereby incorporated by reference in its entirety, as an example.

TECHNICAL FIELD

The present disclosure relates to the field of contactless transmission equipment, and more particularly, to a magnetism modulating ring structure, a magnetic gear assembly, and a compound motor.

BACKGROUND

The magnetic gear assembly generally includes an inner rotor, a magnetism modulating ring, and an outer rotor. Permanent magnets are provided on the outer peripheral surface of the inner rotor and the inner peripheral surface of the outer rotor, and the magnetism modulating ring is an annular structure formed by a plurality of pieces of iron cores assembled at equal intervals. However, the iron core in the conventional magnetism modulating ring has a rectangular-like structure, and the magnetism modulating ring provided with the rectangular-like structure has a limited effect on the magnetic field modulation, and the magnetic leakage between the iron cores is severe, thus reducing the output torque of the magnetic gear assembly. In addition, during manufacture of the magnetism modulating ring, a flux bridge needs to be added to serve as a connection between two adjacent rectangle-like iron cores, and the flux bridge causes relatively severe magnetic leakage due to an unreasonable structure of the flux bridge, thus causing the output torque of the magnetic gear assembly to be further reduced.

SUMMARY

The main objective of the present disclosure is to provide a magnetism modulating ring structure, a magnetic gear assembly, and a compound motor to solve the problems in the related art that the iron core on the magnetism modulating ring has a rectangular-like structure, and that the magnetism modulating ring provided with the rectangular-like structure has a limited effect on the magnetic field modulation, and that the magnetic leakage between the iron cores is severe, thus reducing the output torque of the magnetic gear assembly.

In order to achieve the above objective, according to one aspect of the present disclosure, a magnetism modulating ring structure is provided, and includes a plurality of modulating units and a plurality of connection parts, wherein each two adjacent modulating units are connected by one of the plurality of connection parts to form the magnetism modulating ring structure, and the magnetism modulating ring structure is arranged within an annular gap enclosed by a first rotor structure and a second rotor structure. A groove structure is formed on one side of the modulating unit facing the first rotor structure, and two sides of the groove structure respectively form a curved boot-like part, and an edge of the curved boot-like part facing the second rotor structure has a curved contour line parallel to flux lines passing through an inside of the curved boot-like part.

In some embodiments, adjacent curved boot-like parts are connected by a connection part.

In some embodiments, the plurality of connection parts are made of magnetic material. Two adjacent curved boot-like parts and the connection part form a flux bridge structure. One end of the curved boot-like part away from the connection part forms a flux bridge head of the flux bridge structure, and the connection part forms a flux bridge center of the flux bridge structure.

In some embodiments, $t_1$ denotes a thickness of the flux bridge head of the flux bridge structure, $t_2$ denotes a thickness between an outer circumferential surface of the modulating unit and a boot bottom of the curved boot-like part, and $t_1$ and $t_2$ satisfy: $0.25 \leq t_1/t_2 \leq 0.3$.

In some embodiments, $t_3$ denotes a thickness of the flux bridge center of the flux bridge structure, and $t_3$ satisfies: $t_3 \leq 0.5$ mm.

In some embodiments, a groove wall surface of the groove structure is a first curved face, and $r_1$ denotes a radius of curvature of the first curved face. A smooth transition is arranged between a side surface of the curved boot-like part facing the second rotor structure and a side surface of the connection part facing the second rotor structure, to form a curved transitional surface. A curved contour line of the curved transitional surface is parallel to the flux lines passing through the inside of the curved boot-like part. $r_2$ denotes a radius of curvature of the curved transitional surface, and $r_1$ and $r_2$ satisfy: $r_2 = 5 \times r_1$.

In some embodiments, each modulating unit has a first side and a second side which are arranged to be opposite to each other; $a_1$ denotes an included angle formed between the first side and the second side of each modulating unit, and $a_2$ denotes an included angle formed between the first side of one modulating unit and the first side of the other modulating unit of two adjacent modulating units; $a_1$ and $a_2$ satisfy: $0.4 \leq a_1/a_2 \leq 0.5$; and $r_1$ and $a_1$ satisfy: $0.2 \leq r_1/a_1 \leq 0.3$.

In some embodiments, the plurality of connection parts are made of nonmagnetic material; $t_4$ denotes a thickness of one end of the curved boot-like part away from the connection part; $t_5$ denotes a thickness between an outer circumferential surface of the modulating unit and a boot bottom of the curved boot-like part; and $t_4$ and $t_5$ satisfy: $0.25 \leq t_4/t_5 \leq 0.3$.

In some embodiments, a boot face of the curved boot-like part is a second curved face, and $r_3$ denotes a radius of curvature of the second curved face; a groove wall surface of the groove structure is a third curved face, and $r_4$ denotes a radius of curvature of the third curved face; and $r_3$ and $r_4$ satisfy: $r_3 = 4 \times r_4$.

In some embodiments, each modulating unit has a first side and a second side which are arranged to be opposite to each other; $a_3$ denotes an included angle formed between the first side and the second side of each modulating unit; $a_4$ denotes an included angle formed between boot heads of two curved boot-like parts of each modulating unit; $a_3$ and $a_4$ satisfy: $0.5 \leq a_3/a_4 \leq 0.6$; and $r_4$ and $a_3$ satisfy: $0.2 \leq r_4/a_3 \leq 0.3$.

In some embodiments, the plurality of connection parts and the plurality of modulating units are formed integrally.

According to another aspect of the present disclosure, a magnetic gear assembly is provided and includes the first rotor structure, the second rotor structure, and the magnetism modulating ring structure. The first rotor structure is sleeved on an outer peripheral side of a rotational shaft structure, and a first magnetic member is provided on an outer peripheral surface of the first rotor structure. The second rotor structure is sleeved over an outer peripheral side of the first rotor structure, and a second magnetic member is provided on an inner peripheral surface of the second rotor structure. The magnetism modulating ring structure is arranged in an annular gap enclosed by the first magnetic member and the second magnetic member, and the magnetism modulating ring structure is the magnetism modulating ring structure described above.

In some embodiments, a rotational speed of the first rotor structure is greater than a rotational speed of the magnetism modulating ring structure, and a rotational speed of the second rotor structure is zero.

In some embodiments, a gap is arranged between the magnetism modulating ring structure and the first magnetic member, and a gap is arranged between the magnetism modulating ring structure and the second magnetic member.

In some embodiments, multiple first magnetic members are arranged, and the multiple first magnetic members are arranged at intervals along a circumferential direction of the first rotor structure. And/or multiple second magnetic members are provided, and the multiple second magnetic members are arranged at intervals along a circumferential direction of the second rotor structure.

According to another aspect of the present disclosure, a compound motor is provided, and the compound motor includes a magnetic gear assembly, and the magnetic gear assembly is the magnetic gear assembly described above.

In the technical solutions of the present invention, by modifying the structure of the modulating unit, each modulating unit has the groove structure and two curved boot-like parts. During an operation of the magnetic gear assembly, the groove structure can effectively reduce a variation amplitude of the magnetic density harmonic between the modulating units, thereby reducing the eddy current loss as much as possible. In addition, since an edge of the curved boot-like part has a curved contour line parallel to the flux lines passing through the inside of the curved boot-like part as possible, thus ensuring as many flux lines as possible to pass smoothly, thereby reducing the magnetic leakage between two adjacent modulating units effectively, and greatly improving the output torque of the magnetic gear assembly.

BRIEF DESCRIPTION OF THE DRAWINGS

The accompanying drawings constituting a portion of the present disclosure are used to make the present disclosure to be further understood. The exemplary embodiments of the present disclosure and the description thereof are used to illustrate the present disclosure, but not intended to be construed as improper limitations on the present disclosure. In the accompanying drawings.

DETAILED DESCRIPTION OF THE EMBODIMENTS

The technical solutions in the embodiments of the present disclosure will be described clearly and completely hereinafter by combining with the accompanying drawings in the embodiments of the present disclosure. Obviously, the described embodiments are only part of embodiments rather than all embodiments of the present disclosure. The following description of at least one exemplary embodiment is merely illustrative but not intended to limit the present disclosure and any application or use of the present disclosure. Based on the embodiments in the present disclosure, all other embodiments obtained by those ordinary skilled in the art without involving any inventive efforts are within the scope of protection of the present disclosure.

In order to solve the problems in the related art that the iron core on the magnetism modulating ring has a rectangular-like structure, and that the magnetism modulating ring provided with the rectangular-like structure has a limited effect on the magnetic field modulation, and that the magnetic leakage between the iron cores is severe, thus reducing the output torque of the magnetic gear assembly, the present disclosure provides a magnetism modulating ring structure, a magnetic gear assembly, and a compound motor. The compound motor includes the magnetic gear assembly, and the magnetic gear assembly is the magnetic gear assembly described herein.

Figure 1:
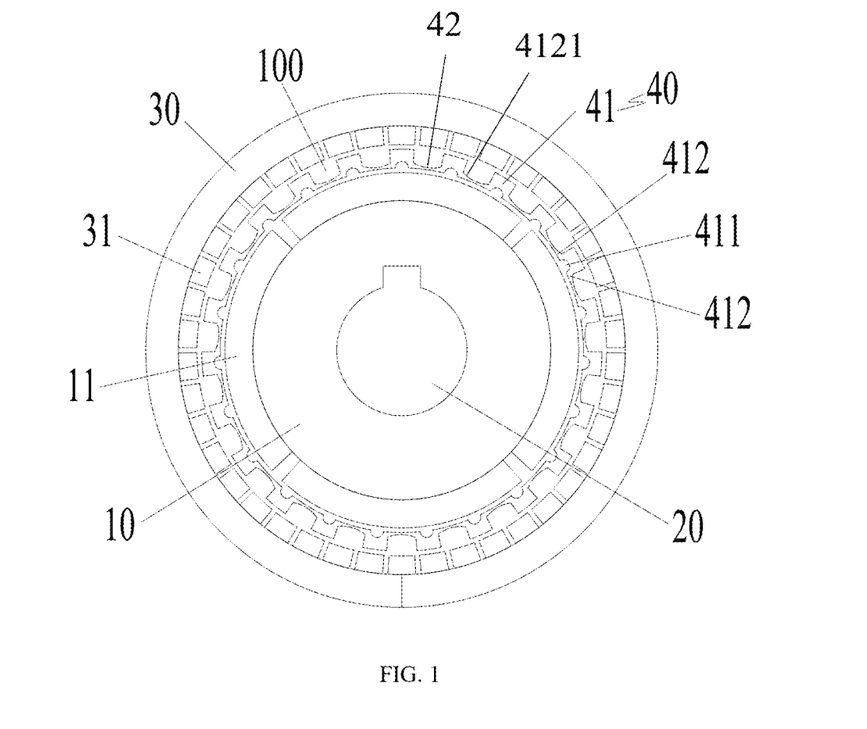
FIG. 1 shows a schematic structural view of a magnetic gear assembly mounted on a rotational shaft structure according to an alternative embodiment of the present disclosure.

As shown in FIG. 1, the magnetic gear assembly includes a first rotor structure 10, a second rotor structure 30, and a magnetism modulating ring structure 40. The first rotor structure 10 is sleeved on an outer peripheral side of the rotational shaft structure 20, and a first magnetic member 11 is provided on an outer peripheral surface of the first rotor structure 10. The second rotor structure 30 is sleeved over an outer peripheral side of the first rotor structure 10, and a second magnetic member 31 is arranged on the inner peripheral surface of the second rotor structure 30. The magnetism modulating ring structure 40 is arranged in an annular gap 100 enclosed by the first magnetic member 11 and the second magnetic member 31, and the magnetism modulating ring structure 40 is the magnetism modulating ring structure described herein.

It should be noted that in the embodiments of the present disclosure, a rotation speed of the first rotor structure 10 is greater than a rotation speed of the magnetism modulating ring structure 40, and a rotation speed of the second rotor structure 30 is zero.

It should be noted that in the embodiments of the present disclosure, a gap is arranged between the magnetism modulating ring structure 40 and the first magnetic member 11, and a gap is arranged between the magnetism modulating ring structure 40 and the second magnetic member 31, thereby enabling the magnetic gear assembly to realize a contactless torque transmission.

As shown in FIG. 1, multiple first magnetic members 11 are provided, and the multiple first magnetic members 11 are arranged at intervals along a circumferential direction of the first rotor structure 10, and/or multiple second magnetic members 31 are provided, and the multiple second magnetic members 31 are arranged at intervals along a circumferential direction of the second rotor structure 30.

First Embodiment

Figure 2:
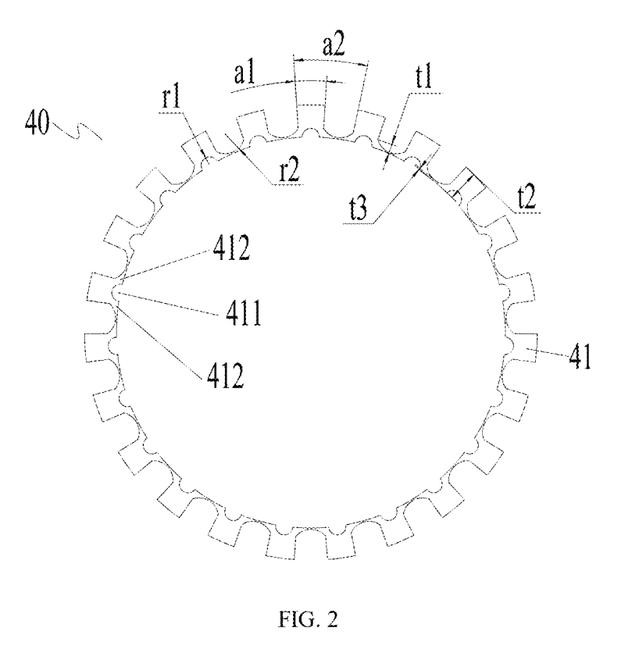
FIG. 2 shows a schematic view of a magnetism modulating ring structure of the magnetic gear assembly in FIG. 1, in which a connection part and a modulating unit are integrally formed.

As shown in FIG. 2, the magnetism modulating ring structure includes a plurality of modulating units 41, and each two adjacent modulating units 41 are connected by a connection part 42 to form the magnetism modulating ring structure, and the magnetism modulating ring structure is arranged within the annular gap 100 enclosed by the first rotor structure 10 and the second rotor structure 30. A groove structure 411 is formed on one side of the modulating unit 41 facing the first rotor structure 10, and two sides of the groove structure 411 respectively form a curved boot-like part 412.

By modifying the structure of the modulating unit 41, each modulating unit 41 has the groove structure 411 and two curved boot-like parts 412. During an operation of the magnetic gear assembly, the groove structure 411 can effectively reduce a variation amplitude of the magnetic density harmonic between the modulating units 41, thereby reducing the eddy current loss as much as possible. In addition, since an edge of the curved boot-like part 412 has a curved contour line 4121 parallel to the flux lines passing through the inside of the curved boot-like part 412 as possible, thus ensuring as many flux lines as possible to pass smoothly, thereby reducing the magnetic leakage between two adjacent modulating units 41 effectively, and greatly improving the output torque of the magnetic gear assembly.

It should be noted that, in the present embodiment, in order to reduce the difficulty in manufacturing the magnetism modulating ring structure, alternatively, the adjacent curved boot-like parts 412 are connected by the connection parts. Further, the connection parts and the modulating units 41 are formed integrally, thereby ensuring subsequent overlaying and forming of the magnetism modulating ring structure.

As shown in FIG. 2, the connection part is made of magnetic material, two adjacent curved boot-like parts 412 and the connection part form a flux bridge structure. One end of the curved boot-like part 412 away from the connection part forms a flux bridge head of the flux bridge structure, and the connection part forms a flux bridge center of the flux bridge structure. t1 denotes a thickness of the flux bridge head of the flux bridge structure, and t2 denotes a thickness between an outer circumferential surface of the modulating unit 41 and the boot bottom of the curved boot-like part 412, and t1 and t2 satisfy: $0.25 \leq t1/t2 \leq 0.3$. In this case, by optimizing a ratio of the thickness t1 of the flux bridge head to the thickness t2 between the outer circumferential surface of the modulating unit 41 and the boot bottom of the curved boot-like part 412, thereby avoiding the case that the flux lines cannot be guided better due to a too small ratio of the thickness t1 of the flux bridge head to the thickness t2 between the outer circumferential surface of the modulating unit 41 and the boot bottom of the curved boot-like part 412, and avoiding a magnetic leakage phenomenon due to a too large ratio of the thickness t1 of the flux bridge head to the thickness t2 between the outer circumferential surface of the modulating unit 41 and the boot bottom of the curved boot-like part 412.

As shown in FIG. 2, t3 denotes a thickness of the flux bridge center of the flux bridge structure, and t3 satisfies: $T3 \leq 0.5$ mm, thereby avoiding a severe magnetic leakage phenomenon due to a too large thickness of the flux bridge center of the flux bridge structure.

As shown in FIG. 2, the groove wall surface of the groove structure 411 is a first curved face, and r1 denotes a radius of curvature of the first curved face. A smooth transition is arranged between a side surface of the curved boot-like part 412 facing the second rotor structure 30 and a side surface of the connection part facing the second rotor structure 30, to form a curved transitional surface. A curved contour line of the curved transitional surface is parallel to the flux lines passing through the inside of the curved boot-like part 412. r2 denotes a radius of curvature of the curved transitional surface, and r1 and r2 satisfy: $r2 = 5 \times r1$. In this case, flux lines can be ensured to pass through the flux bridge structure smoothly as many as possible, thereby reducing the magnetic leakage as much as possible.

As shown in FIG. 2, each modulating unit 41 has a first side and a second side which are arranged to be opposite to each other. a1 denotes an included angle formed between the first side and the second side of each modulating unit 41, and a2 denotes an included angle formed between the first side of one modulating unit 41 and the first side of the other modulating unit 41 of two adjacent modulating units 41, and a1 and a2 satisfy: $0.4 \leq a1/a2 \leq 0.5$, and r1 and a1 satisfy: $0.2 \leq r1/a1 \leq 0.3$, thereby avoiding the case that the modulating units 41 are distributed to be too dense to guide the flux lines.

Second Embodiment

Figure 3:
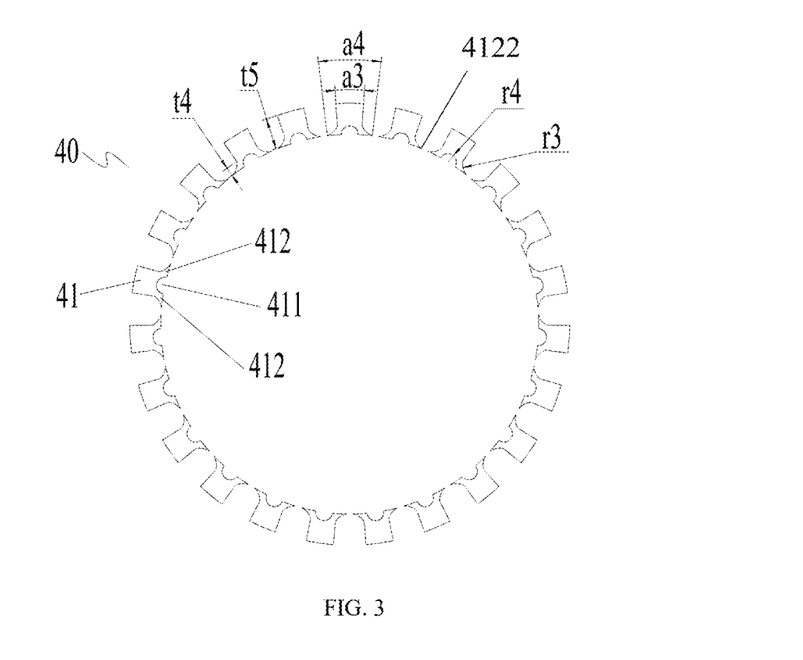
FIG. 3 shows a schematic view of the magnetism modulating ring structure of the magnetic gear assembly in FIG. 1, in which the connection part made of nonmagnetic material is omitted.

It should be noted that, as shown in FIG. 3, the present embodiment differs from the first embodiment in that: the connection part is made of nonmagnetic material; t4 denotes a thickness of one end of the curved boot-like part 412 away from the connection part, and t5 denotes a thickness between the outer circumferential surface of the modulating unit 41 and the boot bottom of the curved boot-like part 412, and t4 and t5 satisfy: $0.25 \leq t4/t5 \leq 0.3$. In this case, the magnetic leakage caused by the presence of the flux bridge structure may be reduced as much as possible, thereby ensuring the output torque of the magnetic gear assembly to be as large as possible.

It should be noted that in the present embodiment, in order to connect all modulating units 41 conveniently to form the magnetism modulating ring structure, all the modulating units 41 are connected by the connection parts made of nonmagnetic material, which facilitates not only the subsequent overlaying and forming but also an installation of the magnetism modulating ring structure.

As shown in FIG. 3, a boot face of the curved boot-like part 412 is a second curved face, and r3 denotes a radius of curvature of the second curved face. The groove wall surface of the groove structure 411 is a third curved face, and r4 denotes a radius of curvature of the third curved face, and r3 and r4 satisfy: $r3=4\times r4$. In this case, the curved boot-like part 412 is ensured to guide the flux lines as many as possible, thereby ensuring that the flux lines can pass through the curved boot-like part 412 smoothly.

As shown in FIG. 3, each modulating unit 41 has a first side and a second side which are arranged to be opposite to each other. a3 denotes an included angle formed between the first side and the second side of each modulating unit 41, and a4 denotes an included angle formed between boot heads 4122 of two curved boot-like parts 412 of each modulating unit 41, and a3 and a4 satisfy: $0.5 \leq a3/a4 \leq 0.6$, and r4 and a3 satisfy: $0.2 \leq r4/a3 \leq 0.3$. In this case, flux lines are ensured to pass through the curved boot-like parts 412 smoothly, thereby reducing the magnetic leakage as much as possible, and further improving the output torque of the magnetic gear assembly.

It should be noted that, in the embodiments of the present disclosure, each modulating unit 41 has the first side and the second side which are arranged to be opposite to each other. The first side and the second side may be named according to the counterclockwise direction of the magnetism modulating ring structure or may be named according to the clockwise direction of the magnetism modulating ring structure.

Figure 4:
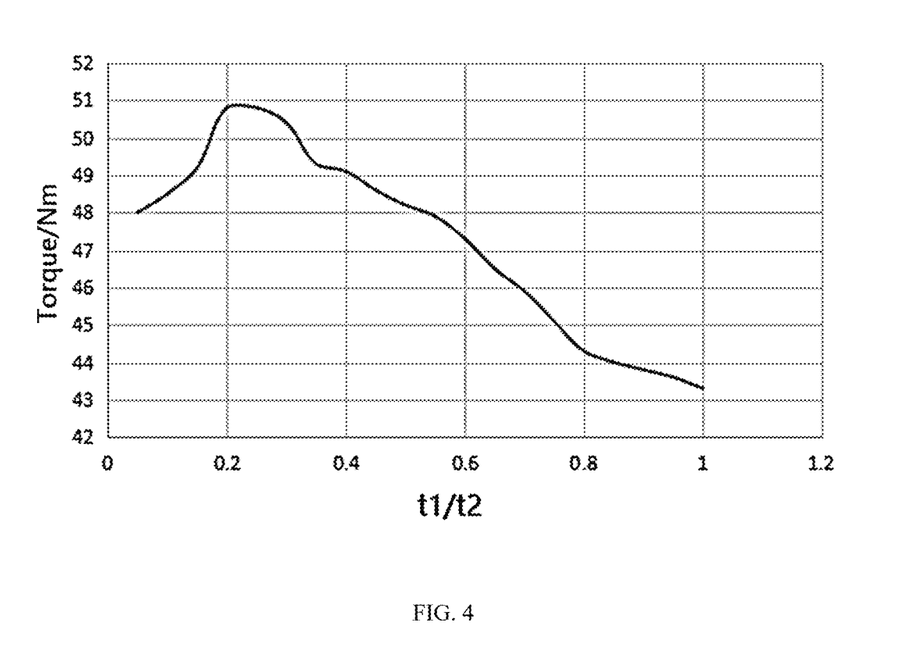
FIG. 4 shows a curve of an output torque of the magnetic gear assembly in FIG. 1 changing with t1/t2.

FIG. 4 shows a curve of an output torque of the magnetic gear assembly changing with t1/t2. As can be seen from FIG. 4, when $t1/t2=0.2$, the output torque of the magnetic gear assembly reaches a peak of about 51 Nm. When $t1/t2<0.2$, the output torque of the magnetic gear assembly increases as the ratio t1/t2 increases. When $t1/t2>0.2$, the output torque of the magnetic gear assembly decreases as the ratio t1/t2 increases.

Figure 5:
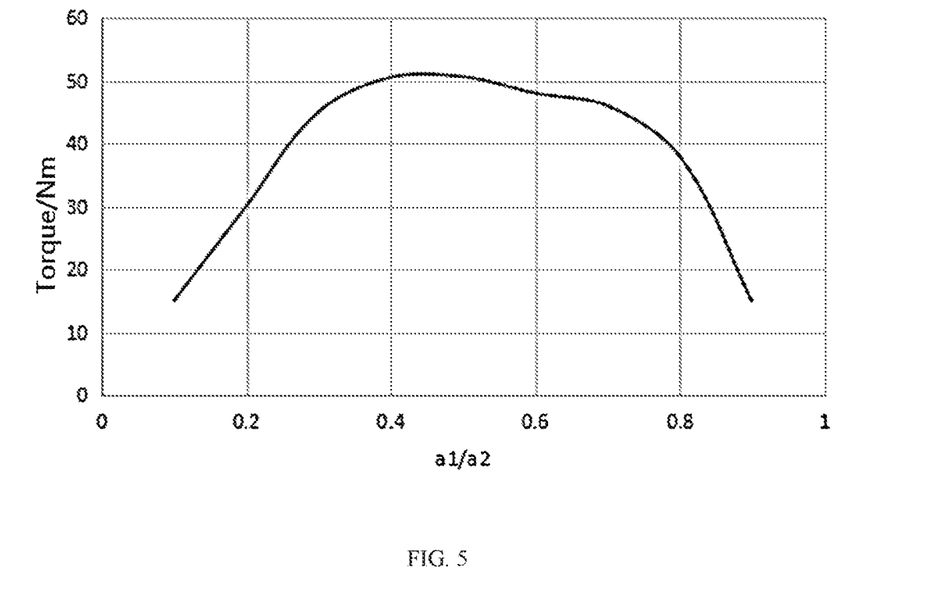
FIG. 5 shows a curve of the output torque of the magnetic gear assembly in FIG. 1 changing with a1/a2.

FIG. 5 shows a curve of the output torque of the magnetic gear assembly changing with a1/a2. As can be seen from FIG. 5, when $a1/a2<0.4$, the output torque of the magnetic gear assembly increases as the ratio a1/a2 increases. When $0.4 \leq a1/a2 \leq 0.6$, the curve of the output torque of the magnetic gear assembly changing with a1/a2 is substantially flat. When $a1/a2>0.6$, the output torque of the magnetic gear assembly decreases as the ratio a1/a2 increases.

Figure 6:
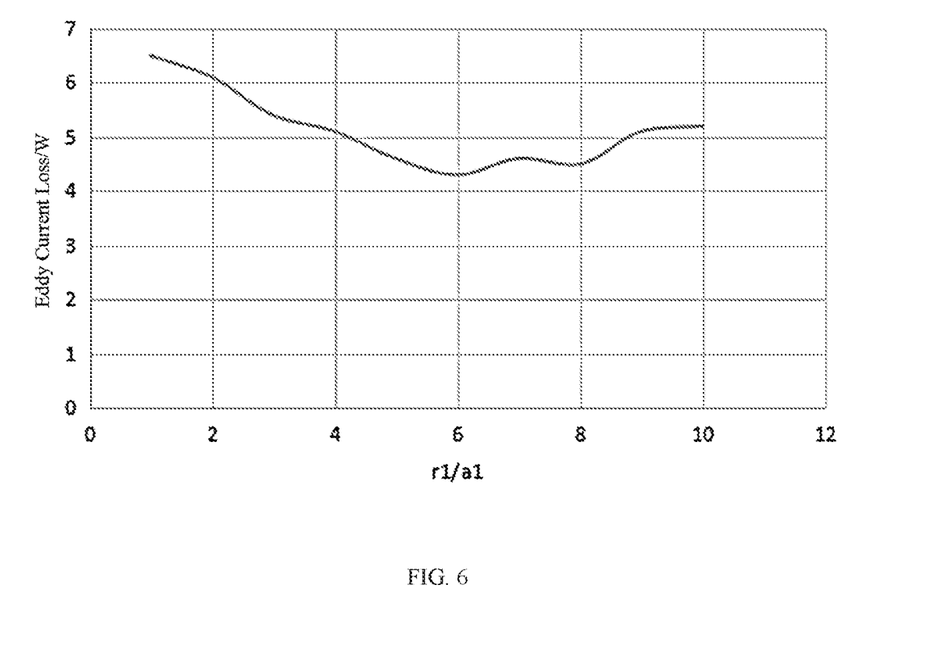
FIG. 6 shows a curve of an eddy current loss of the magnetic gear assembly in FIG. 1 changing with r1/a1.

FIG. 6 shows a curve of an eddy current loss of the magnetic gear assembly changing with r1/a1. As can be seen from FIG. 6, when $r1/a1=6$, the eddy current loss of the magnetic gear assembly is the lowest. When $r1/a1<6$, the eddy current loss of the magnetic gear assembly decreases as the ratio r1/a1 increases. When $r1/a1>6$, the eddy current loss of the magnetic gear assembly tends to increase as the ratio r1/a1 increases.

Figure 7:
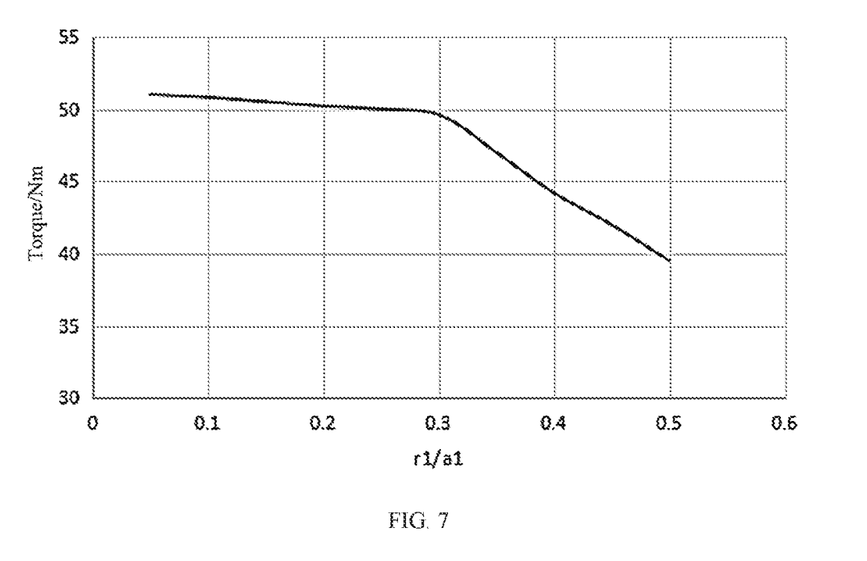
FIG. 7 shows a curve of the output torque of the magnetic gear assembly in FIG. 1 changing with r1/a1.

FIG. 7 shows a curve of the output torque of the magnetic gear assembly changing with r1/a1. As can be seen from FIG. 7, when $r1/a1 \leq 0.3$, the output torque of the magnetic gear assembly tends to decrease smoothly as the ratio r1/a1 increases. When $r1/a1>0.3$, the output torque of the magnetic gear assembly tends to decrease rapidly as the ratio r1/a1 increases, and a slope of the latter is greater than a slope of the former.

Figure 8:
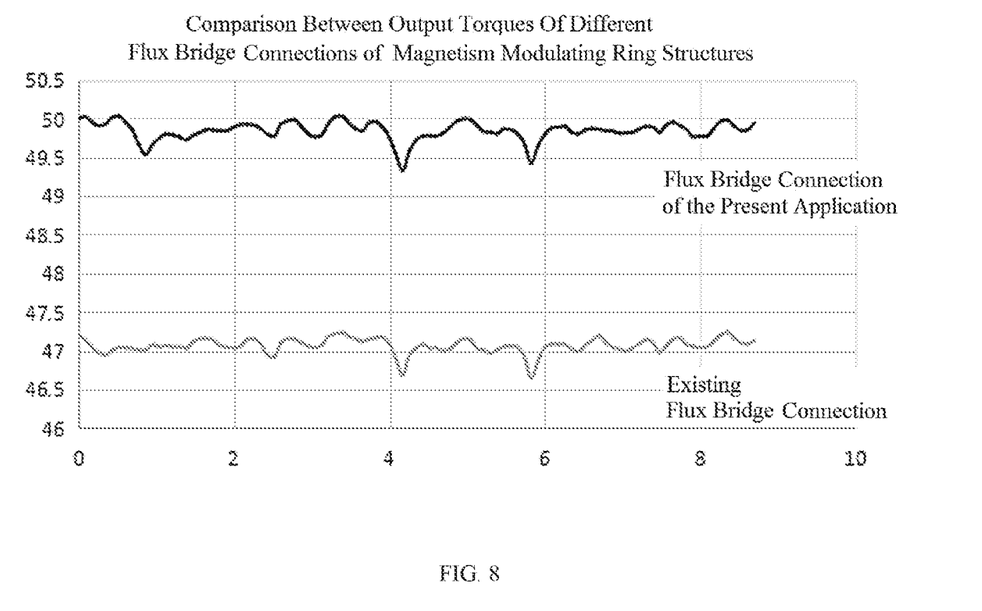
FIG. 8 is a view showing a comparison between an output torque of a flux bridge structure of an alternative embodiment of the present disclosure and an output torque of an existing flux bridge structure.

FIG. 8 is a view showing a comparison between the output torque of a flux bridge structure of the first embodiment and the output torque of an existing flux bridge structure. As can be seen from FIG. 8, the flux bridge connection manner provided by the present disclosure can ensure that the magnetic gear assembly outputs a larger output torque than the output torque of the magnetic gear assembly of the existing flux bridge connection manner.

Figure 9:
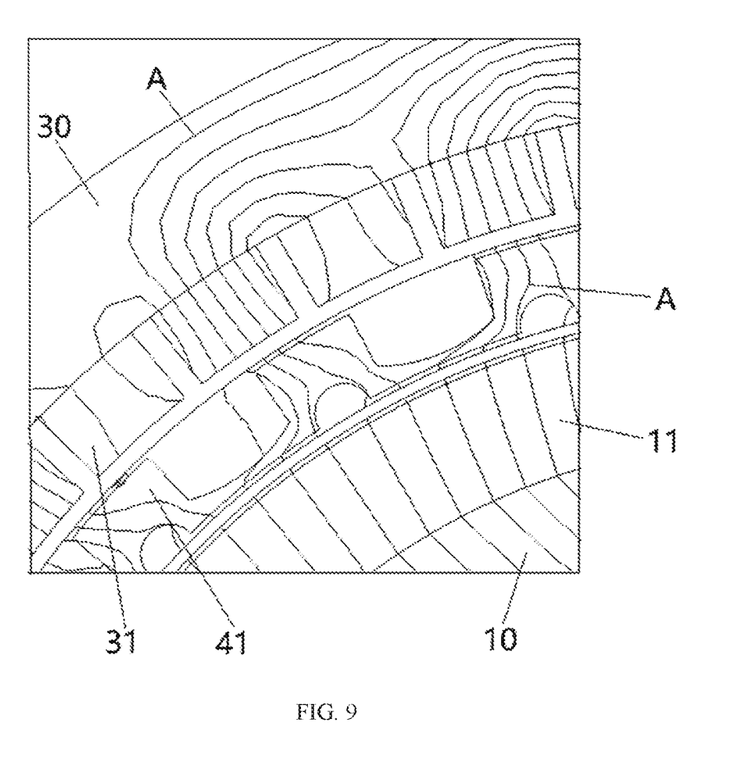
FIG. 9 shows flux lines of the magnetic gear assembly distributed in the magnetism modulating ring structure according to an alternative embodiment of the present disclosure.

FIG. 9 shows flux lines of the magnetic gear assembly distributed in the magnetism modulating ring structure of the first embodiment. In FIG. 9, A denotes flux lines.

Figure 10:
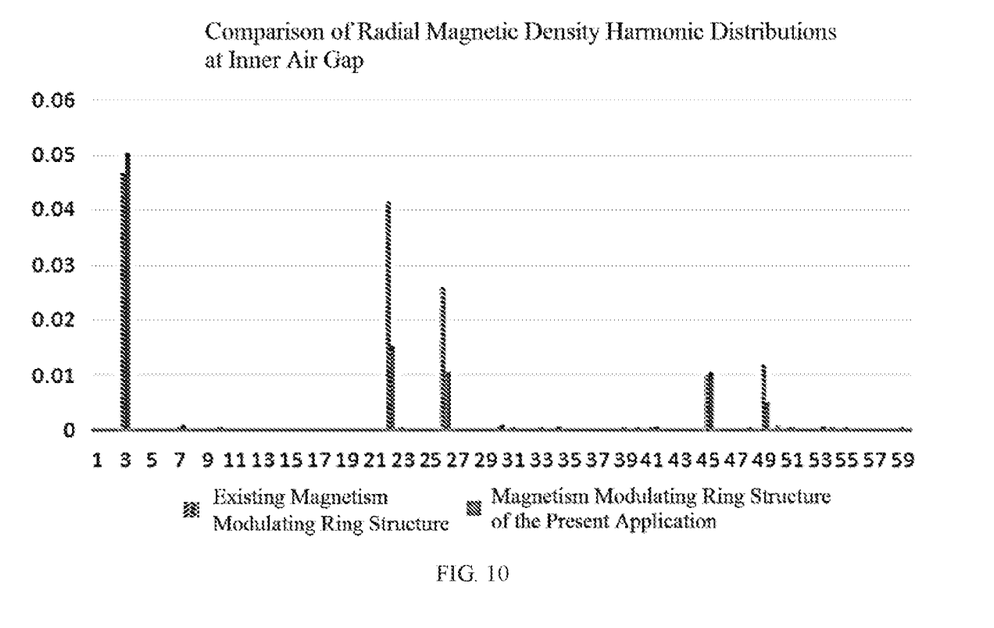
FIG. 10 shows a comparison of radial magnetic density harmonic distributions at an inner air gap.

FIG. 10 shows a comparison of radial magnetic density harmonic distributions at an inner air gap.

Figure 11:
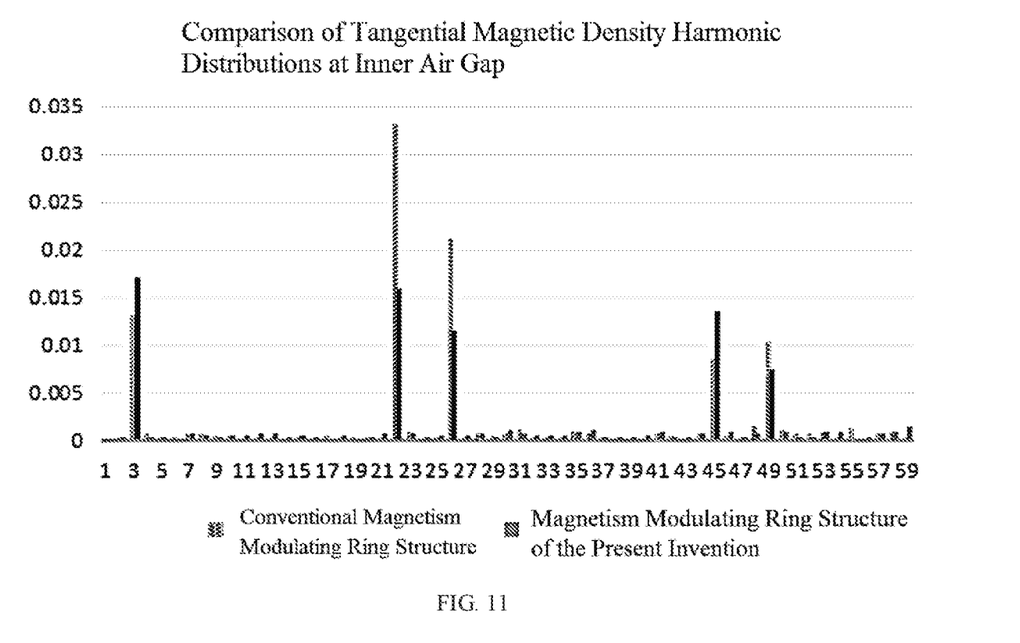
FIG. 11 shows a comparison of tangential magnetic density harmonic distributions at the inner air gap.

FIG. 11 shows a comparison of tangential magnetic density harmonic distributions at the inner air gap.

Figure 12:
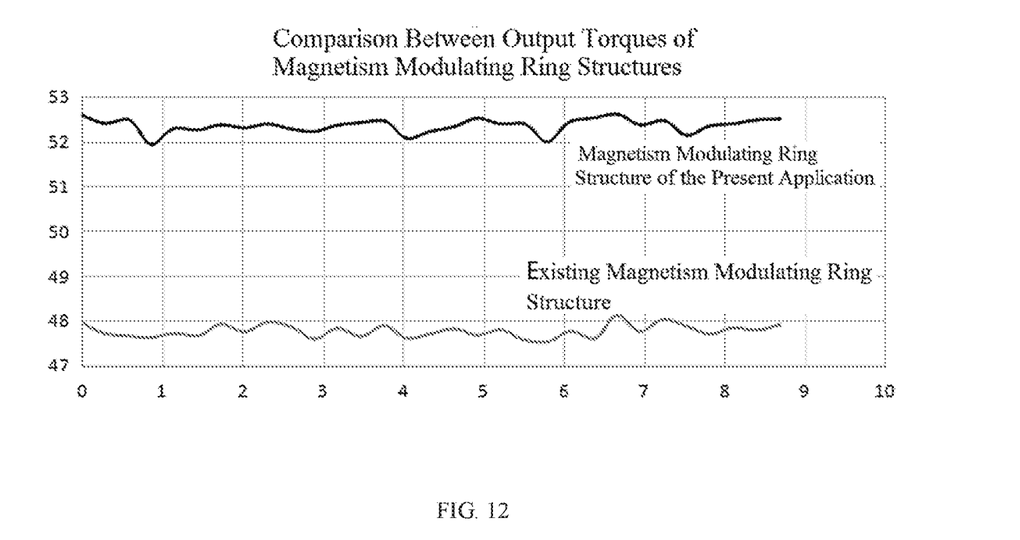
FIG. 12 is a view showing a comparison between an output torque of a magnetism modulating ring structure of an alternative embodiment of the present disclosure and an output torque of an existing magnetism modulating ring structure.

FIG. 12 is a view showing a comparison between an output torque of a magnetism modulating ring structure of the first embodiment and an output torque of an existing magnetism modulating ring structure. The magnetism modulating ring structure provided by the present disclosure can ensure that the magnetic gear assembly outputs a larger output torque than the output torque of the magnetic gear assembly of the existing magnetism modulating ring structure.

It should be noted that, the terminology herein is used for describing the specific embodiments, but not intended to limit the illustrative embodiments of the present disclosure. The singular terms used herein are intended to include their plural unless specific descriptions are provided in context. It should be also understood that, the terms "include" and/or "comprise" in the description refer to including the features, steps, operations, devices, components, and/or combinations thereof.

Unless otherwise specified, the relative arrangement, numerical expressions and values of the components and steps described in these embodiments do not limit the scope of this disclosure. Moreover, it should be understood that, for convenience of description, the dimensions of the parts shown in the accompanying drawings are not in accordance with actual proportionality. The technologies, methods and devices known to those of ordinary skill in the relevant fields may not be discussed in detail, but, where appropriate, the technologies, the methods and the devices shall be considered as part of the allowed specification. In all the examples shown and discussed herein, any specific value should be interpreted as merely an example, not as a limitation. Other examples of exemplary embodiments may therefore have different values. It should be noted that similar reference numerals and letters denote similar terms in the following figures, so that once a particular term is defined in one of the figures, further discussion is not required in the subsequent drawings.

For the convenience of description, terms of spatial relations such as "above", "over", "on a top surface", "upper", etc., may be used herein to describe the spatial position relationships of a device or a feature with other devices or features shown in the drawings. It should be understood that the terms of spatial relations are intended to include other different orientations in use or operation in addition to the orientation of the device described in the drawings. For example, if the device in the drawings is placed upside down, the device described as "above other devices or structures" or "over other devices or structures" will be positioned as "below other devices or structures" or "under other devices or structures". Thus, the exemplary term "above" may include both "above" and "below". The device can also be positioned in other different ways (rotating 90 degrees or at other orientations), and the corresponding explanations for the description of the spatial relations will be provided herein.

It should be noted that, the terminology herein is used for describing the specific embodiments, but not intended to limit the illustrative embodiments of the present disclosure. The singular terms used herein are intended to include their plural unless specific descriptions are provided in context. It should be also understood that, the terms "include" and/or "comprise" in the description refer to including the features, steps, operations, devices, components, and/or combinations thereof.

It should be specified that the terms "first", "second", etc. in the description, the claims and the drawings in the present disclosure are just used to distinguish similar objects, but not used to describe a specific order or an order of priority. It should be understood that such terms may be interchangeable under appropriate conditions, such that the embodiments of the present disclosure illustrated in the drawing or described herein can be implemented, for example, in a sequence other than the sequences illustrated or described herein.

What described above are some embodiments of the present disclosure, but not intended to limit the present disclosure. For those skilled in the art, various amendments and modifications can be made. Any modifications, equivalent substitutions and improvements made within the spirits and principles of the present disclosure are all within the scope of protection of the present disclosure.

What is claimed is:

1. A magnetism modulating ring structure, comprising:
    a plurality of modulating units and a plurality of connection parts;
    wherein each two adjacent modulating units are connected by one of the plurality of connection parts to form the magnetism modulating ring structure, and the magnetism modulating ring structure is arranged within an annular gap enclosed by a first rotor structure and a second rotor structure;
    a groove structure is formed on one side of the modulating unit facing the first rotor structure, and two sides of the groove structure respectively form a curved boot-like part, and an edge of the curved boot-like part facing the second rotor structure has a curved contour line parallel to flux lines passing through an inside of the curved boot-like part;
    each modulating unit has a first side and a second side which are arranged to be opposite to each other, one curved boot-like part of the first side of one modulating unit of two adjacent modulating units and another curved boot-like part of the second side of the other modulating unit of the two adjacent modulating units are connected to a same connection part; and
    the plurality of connection parts are made of magnetic material; two adjacent curved boot-like parts connected to the same connection part form a flux bridge structure; one end of the curved boot-like part away from the connection part forms a flux bridge head of the flux bridge structure, and the connection part forms a flux bridge center of the flux bridge structure.

2. The magnetism modulating ring structure according to claim 1, wherein t1 denotes a thickness of the flux bridge head of the flux bridge structure, t2 denotes a thickness between an outer circumferential surface of the modulating unit and a boot bottom of the curved boot-like part, and t1 and t2 satisfy: $0.25 \leq t1/t2 \leq 0.3$.

3. The magnetism modulating ring structure according to claim 1, wherein t3 denotes a thickness of the flux bridge center of the flux bridge structure, and t3 satisfies: $t3 \leq 0.5$ mm.

4. The magnetism modulating ring structure according to claim 1, wherein a groove wall surface of the groove structure is a first curved face, and r1 denotes a radius of curvature of the first curved face; a smooth transition is arranged between a side surface of the curved boot-like part facing the second rotor structure and a side surface of the connection part facing the second rotor structure, to form a curved transitional surface; a curved contour line of the curved transitional surface is parallel to the flux lines passing through the inside of the curved boot-like part; and r2 denotes a radius of curvature of the curved transitional surface, and r1 and r2 satisfy: $r2=5 \times r1$.

5. The magnetism modulating ring structure according to claim 4, wherein a1 denotes an included angle formed between the first side and the second side of each modulating unit, and a2 denotes an included angle formed between the first side of one modulating unit and the first side of the other modulating unit of two adjacent modulating units; and a1 and a2 satisfy: $0.4 \leq a1/a2 \leq 0.5$.

6. The magnetism modulating ring structure according to claim 1, wherein the plurality of connection parts and the plurality of modulating units are formed integrally.

7. A magnetic gear assembly, comprising:
    the first rotor structure, wherein the first rotor structure is configured to be sleeved on an outer peripheral side of a rotational shaft structure, and a first magnetic member is provided on an outer peripheral surface of the first rotor structure;
    the second rotor structure, wherein the second rotor structure is sleeved over an outer peripheral side of the first rotor structure, and a second magnetic member is provided on an inner peripheral surface of the second rotor structure; and
    the magnetism modulating ring structure of claim 1, wherein the magnetism modulating ring structure is arranged in an annular gap enclosed by the first magnetic member and the second magnetic member.

8. The magnetic gear assembly according to claim 7, wherein a rotational speed of the first rotor structure is greater than a rotational speed of the magnetism modulating ring structure, and a rotational speed of the second rotor structure is zero.

9. The magnetic gear assembly according to claim 8, wherein a gap is arranged between the magnetism modulating ring structure and the first magnetic member, and a gap is arranged between the magnetism modulating ring structure and the second magnetic member.

10. The magnetic gear assembly according to claim 7, wherein a gap is arranged between the magnetism modulating ring structure and the first magnetic member, and a gap is arranged between the magnetism modulating ring structure and the second magnetic member.

11. The magnetic gear assembly according to claim 7, wherein multiple first magnetic members are arranged, and the multiple first magnetic members are arranged at intervals along a circumferential direction of the first rotor structure.

12. The magnetic gear assembly according to claim 11, wherein multiple second magnetic members are provided, and the multiple second magnetic members are arranged at intervals along a circumferential direction of the second rotor structure.

13. The magnetic gear assembly according to claim 7, wherein multiple second magnetic members are provided, and the multiple second magnetic members are arranged at intervals along a circumferential direction of the second rotor structure.

\* \* \* \* \*